United States Patent
Tsuyoshi et al.

(10) Patent No.: US 9,643,461 B2
(45) Date of Patent: May 9, 2017

(54) STRUCTURE FOR MOUNTING HOOK BRACKET TO BUMPER REINFORCE AND BUMPER STRUCTURE

(71) Applicant: Kobe Steel, Ltd., Kobe-shi (JP)

(72) Inventors: Tsunetake Tsuyoshi, Shimonoseki (JP); Narikazu Hashimoto, Shimonoseki (JP)

(73) Assignee: Kobe Steel, Ltd., Kobe-shi (JP)

( * ) Notice: Subject to any disclaimer, the term of this patent is extended or adjusted under 35 U.S.C. 154(b) by 0 days.

(21) Appl. No.: 15/052,233

(22) Filed: Feb. 24, 2016

(65) Prior Publication Data

US 2016/0280024 A1 Sep. 29, 2016

(30) Foreign Application Priority Data

Mar. 26, 2015 (JP) ................................. 2015-063822

(51) Int. Cl.
*B60D 1/56* (2006.01)
*B60D 1/04* (2006.01)

(52) U.S. Cl.
CPC ........ *B60D 1/04* (2013.01); *B60D 1/56* (2013.01)

(58) Field of Classification Search
CPC ............ B60D 1/565; B60D 1/04; B60R 19/48
See application file for complete search history.

(56) References Cited

U.S. PATENT DOCUMENTS

| 3,588,160 A * | 6/1971 | Reiner | B60D 1/485 |
| | | | 105/449 |
| 6,386,573 B1 * | 5/2002 | Solomon | B60D 1/488 |
| | | | 280/491.5 |
| 6,724,117 B1 * | 4/2004 | Lungu | H02K 1/185 |
| | | | 310/179 |
| 2004/0041416 A1 * | 3/2004 | Harrison | B60D 1/485 |
| | | | 293/117 |
| 2005/0051994 A1 * | 3/2005 | Rodgers | B60D 1/00 |
| | | | 280/416.1 |
| 2005/0212311 A1 * | 9/2005 | Haneda | B60D 1/565 |
| | | | 293/117 |

(Continued)

FOREIGN PATENT DOCUMENTS

JP 4229388 2/2009
JP 5374431 12/2013

*Primary Examiner* — Kevin Hurley
*Assistant Examiner* — Gabriela C Craciun
(74) *Attorney, Agent, or Firm* — Oblon, McClelland, Maier & Neustadt, L.L.P.

(57) ABSTRACT

The present invention relates to a structure for mounting a hook bracket formed of an aluminum alloy extrusion to a bumper reinforce having a hollow cross-section, and further reduces the weight of the hook bracket and the weight of the mount structure without deteriorating towing performance. The hook bracket has a cut that is formed in an extrusion cross-section (a cross-section perpendicular to the direction of extrusion) and extended from the rear end of a shaft portion into the hollow in the bumper reinforce. Further, an internally threaded hole is formed. The shaft portion of the hook bracket is penetrated through a hole formed in front and rear walls of the bumper reinforce and fillet-welded to the front and rear walls. The shaft portion is not fillet-welded to the rear wall at a position where the cut is formed.

10 Claims, 3 Drawing Sheets

(56) References Cited

U.S. PATENT DOCUMENTS

| | | | |
|---|---|---|---|
| 2006/0071494 A1* | 4/2006 | Ganz | B60Q 1/484 |
| | | | 296/1.07 |
| 2008/0277950 A1* | 11/2008 | Nees | B60R 19/48 |
| | | | 293/106 |
| 2008/0284134 A1* | 11/2008 | Temple | B60D 1/00 |
| | | | 280/495 |
| 2011/0187081 A1* | 8/2011 | Ando | B60D 1/04 |
| | | | 280/477 |
| 2012/0066979 A1* | 3/2012 | Brown | B60R 19/48 |
| | | | 49/463 |
| 2012/0292930 A1* | 11/2012 | Hermanson | B60D 1/565 |
| | | | 293/102 |
| 2015/0048635 A1* | 2/2015 | Ishitobi | B60D 1/565 |
| | | | 293/117 |

* cited by examiner

STRUCTURE FOR MOUNTING HOOK BRACKET TO BUMPER REINFORCE AND BUMPER STRUCTURE

BACKGROUND OF THE INVENTION (1) Field of the Invention

The present invention relates to a structure for mounting a hook bracket to a bumper reinforce and a bumper structure.

(2) Description of the Related Art

A hook attached to an automobile is mainly used to tow another vehicle or used as a tie-down for securing the automobile to a ship when the automobile is placed on the ship. A great tensile load is applied to the hook in a forward direction or in a forward-downward direction. When an aluminum alloy extrusion having a hollow cross-section was introduced as a bumper reinforce, high rigidity of the hollow cross-section was used to propose a mount structure that is obtained by penetrating a hook bracket through a hole in front and rear walls of the bumper reinforce and welding the hook bracket to the front and rear walls.

According to Japanese Patent No. 4229388 (FIGS. 1 and 2), a hook bracket that is formed of an aluminum alloy extrusion and provided with a flange placed near the front end of a shaft portion and at the left and right of the rear end of the shaft portion is penetrated through a hole in the front and rear walls of a bumper reinforce and fillet-welded to the front and rear walls. In order to provide improved towing performance, a mount structure for the hook bracket is formed by bringing the flange near the front end of the hook bracket into contact with the rear surface of the front wall and bringing the flanges at the rear end into contact with the rear surface of the rear wall.

According to Japanese Patent No. 5374431, a hook bracket that is formed of an aluminum alloy extrusion and provided with an upward protruding rib near the front end of a shaft portion is penetrated through a hole in the front and rear walls of a bumper reinforce and fillet-welded to the front and rear walls. The direction of hook bracket extrusion is parallel to the longitudinal direction of the bumper reinforce. In order to provide improved towing performance particularly during a tie-down period, a mount structure for the hook bracket is formed by welding the rim of the rib to the front wall.

SUMMARY OF THE INVENTION

The mount structure described in Japanese Patents No. 4229388 (FIGS. 1 and 2) and No. 5374431 is formed so that the bumper reinforce and the hook bracket are both formed of an aluminum alloy extrusion and that the hook bracket is welded to the front and rear walls of the bumper reinforce having high rigidity. Therefore, the mount structure is light in weight and provided with high towing performance.

Meanwhile, it is demanded for vehicle body weight reduction that the hook bracket and the mount structure be further reduced in weight. In view of the above circumstances, the present invention has been made to further reduce the weight of the hook bracket and of the mount structure without deteriorating the towing performance.

As regards a structure for mounting a hook bracket to a bumper reinforce according to an embodiment of the present invention, the hook bracket is formed of an aluminum alloy extrusion and provided with a cut in an extrusion cross-section (a cross-section perpendicular to the direction of extrusion). The cut is extended from the rear end of a shaft portion into the hollow in the bumper reinforce. The shaft portion of the hook bracket is penetrated through a hole formed in the front and rear walls of the bumper reinforce having a hollow cross-section and welded to the front and rear walls. The cut may be formed in various shapes such as the shape of the letter U, the letter V, or a semicircle.

It is preferred that the hook bracket have a rib, which protrudes upward from the shaft portion into the extrusion cross-section, and that the rib be brought into contact with the front wall of the bumper reinforce from the front side. In this instance, it is preferred that a fillet be formed in the extrusion cross-section between the front side of the rib and the shaft portion and concaved.

As regards a bumper structure according to an embodiment of the present invention, the bumper structure comprises a bumper reinforce including a front wall and a rear wall and a hook bracket penetrating the bumper reinforce through a hole formed in the front wall and the rear wall, and being welded to the front wall and the rear wall. And the hook bracket includes a cut that extends toward a front end of the hook bracket from a rear end of the hook bracket.

In the present invention, the term "front" denotes a collision surface side and the term "rear" denotes a vehicle body side.

The hook bracket according to the embodiment of the present invention has a cut in the extrusion cross-section. The cut is extended from the rear end of the shaft portion into the hollow in the bumper reinforce. Therefore, the hook bracket achieves considerably greater weight reduction than during the use of a conventional material without the cut although the degree of weight reduction varies with the shape and depth of the cut.

A conventional hook bracket is configured so that an internally threaded hole is formed from the front end of the shaft portion to the rear end. However, when the conventional hook bracket is used, a hook is not screwed to the rear end of the hook bracket. In reality, the hook is merely screwed approximately 30 mm inward from the front end to obtain required towing performance.

Meanwhile, when the hook bracket according to the embodiment of the present invention is used, an internally threaded hole engaging with the whole circumference of an external thread on the hook can be formed merely between the front end of the shaft portion and the bottom of the cut. This reduces the effective length of the internally threaded hole. However, even when the conventional hook bracket is used, the hook can be merely screwed approximately 30 mm into the internally threaded hole as mentioned above. This is sufficient to obtain the required towing performance. Consequently, even if the effective length of the internally threaded hole for the hook bracket according to the embodiment of the present invention is reduced by the depth of the cut, the towing performance of the hook bracket according to the embodiment of the present invention will not actually be lower than the towing performance of the conventional hook bracket.

When the mount structure uses the conventional hook bracket, the rear wall of the bumper reinforce and the hook bracket can be subjected to all-around fillet welding.

Meanwhile, when the mount structure uses the hook bracket according to the embodiment of the present invention, the rear wall of the bumper reinforce and the hook bracket cannot be fillet-welded at positions where the cut is formed (at the left and right of the hook bracket). However, when the mount structure uses the conventional hook bracket, the left and right welds between the rear wall of the bumper reinforce and the hook bracket do not significantly contribute to the towing performance as described later.

Therefore, even if cut portions are not fillet-welded when the mount structure uses the hook bracket according to the embodiment of the present invention, it does not significantly deteriorate the towing performance.

BRIEF DESCRIPTION OF THE DRAWINGS

An embodiment of the present invention will be described in detail based on the following figures, in which.

DETAILED DESCRIPTION OF THE INVENTION

A structure for mounting a hook bracket to a bumper reinforce and a bumper structure that is formed in accordance with an embodiment of the present invention will now be described with reference to FIGS. 1 to 5.

Figure 1:
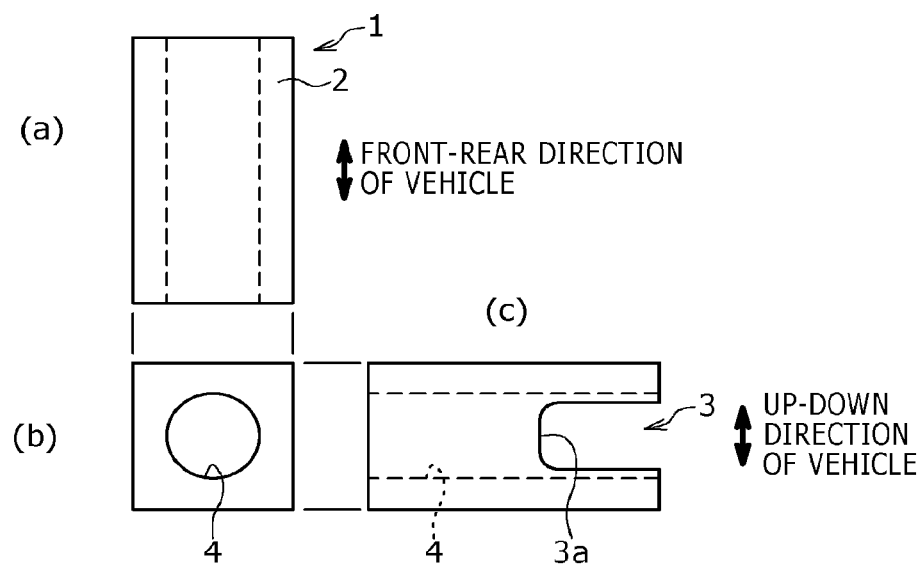
FIG. 1 presents a plan view (a), a front view (b), and a side view (c) of an example of a hook bracket according to the embodiment of the present invention.

The hook bracket 1 illustrated in FIG. 1 is formed of an aluminum alloy extrusion. The extrusion direction of the aluminum alloy extrusion is perpendicular to the sheet of (c) in FIG. 1. The hook bracket 1 is formed of only a shaft portion 2. In the plan view, the hook bracket 1 has a rectangular outline. In the front view, the hook bracket 1 has a substantially square outline. A U-shaped cut 3 having a predetermined depth is formed from the rear end of the shaft portion 2 (from the right end of (c) in FIG. 1) in an extrusion cross-section (a cross-section perpendicular to the extrusion direction). An internally threaded hole 4 is formed longitudinally from the front end of the shaft portion 2 toward the rear end. The effective length of the internally threaded hole 4 (the length along which the internally threaded hole 4 engages with the whole circumference of an external thread on a hook) is as measured from the vicinity of the front end of the shaft portion 2 to the bottom 3a of the cut 3.

Figure 2:
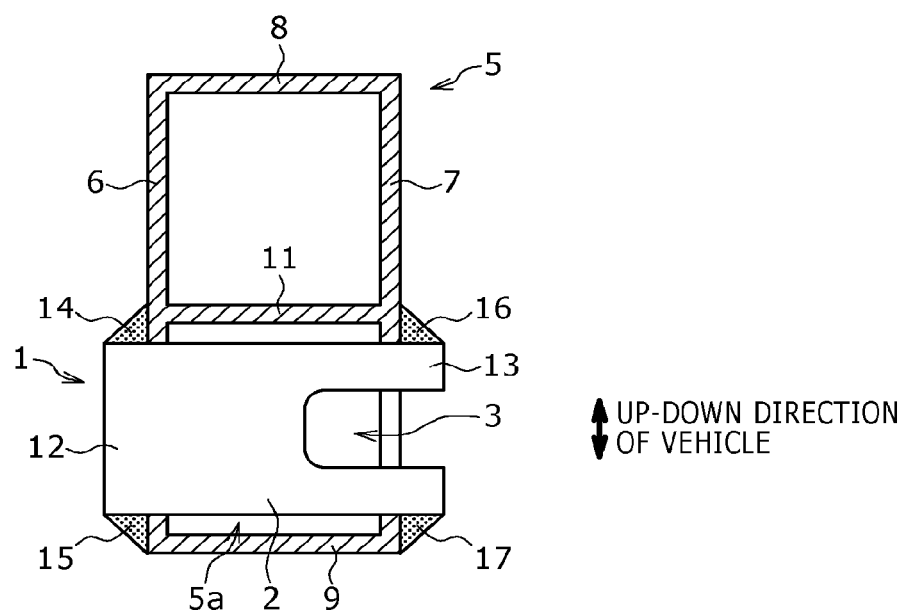
FIG. 2 is a cross-sectional view illustrating a mount structure of the hook bracket depicted in FIG. 1 to a bumper reinforce.

The bumper reinforce 5 in the mount structure illustrated in FIG. 2 is formed of an aluminum alloy extrusion. Its cross-sectional shape includes a front wall 6, a rear wall 7, an upper wall 8, a lower wall 9, and an inner rib 11, which form a rectangular outline. The front wall 6 and the rear wall 7 are oriented substantially perpendicularly to the longitudinal direction of a vehicle body. A hole is formed in the front wall 6 and rear wall 7 of a box 5a (surrounded by the front wall 6, the rear wall 7, the inner rib 11, and the lower wall 9), which is positioned below the bumper reinforce 5. The shaft portion 2 of the hook bracket 1 is penetrated through the hole in the longitudinal direction of the vehicle body. The front end of the shaft portion 2 of the hook bracket 1 protrudes from the front wall 6 (protrusion 12) and the rear end protrudes from the rear wall 7 (protrusion 13). The whole circumference of the front protrusion 12 of the shaft portion 2 is fillet-welded to the front wall 6 (the rim of the hole through which the shaft portion 2 penetrates) (only upper and lower welds 14, 15 are depicted in the figure). The rear protrusion 13 and the rear wall 7 (the rim of the hole through which the shaft portion 2 penetrates) are fillet-welded at upper and lower contacts (upper and lower welds 16, 17 are depicted in the figure), but are not fillet-welded at left and right contacts. It is preferred that the whole circumference of the protrusion 12 be fillet-welded to the front wall 6 in order to obtain an increased weld length. However, such fillet welding is not essential. An alternative welding form may be employed. For example, a part of the circumference (particularly the left and right contacts) may be left unwelded as described in Japanese Patent No. 5374431.

FIGS. 3A to 3D illustrate some other hook brackets according to the embodiment of the present invention (these hook brackets are formed of an aluminum extrusion).

Figure 3A:
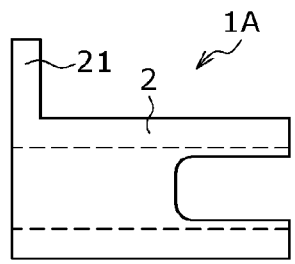
FIGS. 3A to 3D are side views illustrating some other examples of the hook bracket according to the embodiment of the present invention.

The hook bracket 1A, which is illustrated in FIG. 3A, differs from the hook bracket 1 in that the former includes an upward protruding rib 21 at the front end of the shaft portion 2. When the hook bracket 1A is to be mounted on the bumper reinforce 5, the rib 21 is brought into contact with the front wall 6 of the bumper reinforce 5 from the front side and fillet-welded to the front wall 6. In this instance, it is preferred that all-around fillet welding be performed in such a manner as to include the rib 21. As the hook bracket 1A includes the rib 21, towing load is efficiently transmitted to the rear wall 7 through the inner rib 11 and upper wall 8 of the bumper reinforce 5. This strengthens the structure for mounting the hook bracket 1A to the bumper reinforce 5.

Figure 3C:
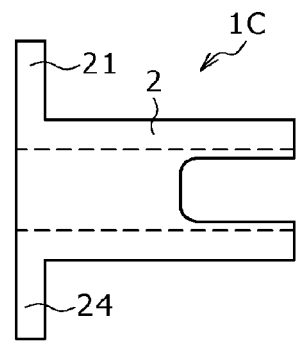
Figure 3B:
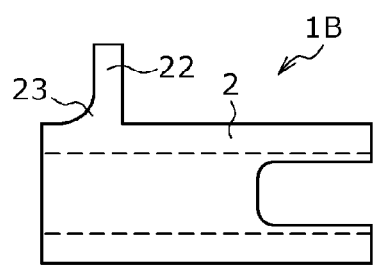

The hook bracket 1B, which is illustrated in FIG. 3B, differs from the hook bracket 1 in that the former includes an upward protruding rib 22 near the front end of the shaft portion 2 and that a fillet 23 is formed between the front side of the rib 22 and the shaft portion 2. When the hook bracket 1B is to be mounted on the bumper reinforce 5, the rib 22 is brought into contact with the front wall 6 of the bumper reinforce 5 from the front side and fillet-welded to the front wall 6. In this instance, it is preferred that all-around fillet welding be performed in such a manner as to include an area around the rib 22. Although the rib 22 is functionally the same as the rib 21 of the hook bracket 1A, the fillet 23 having a concave surface is formed between the front side of the rib 22 and the shaft portion 2. The fillet 23 prevents a portion between the rib 22 and the shaft portion 2 from being cracked by load applied, for instance, during a tie-down period.

The hook bracket 1C, which is illustrated in FIG. 3C, differs from the hook bracket 1 in that the former includes a downward protruding rib 24 at the front end of the shaft portion 2 in addition to the upward protruding rib 21. When the hook bracket 1C is to be mounted on the bumper reinforce 5, the rib 24 is brought into contact with the front wall 6 of the bumper reinforce 5 from the front side and fillet-welded to the front wall 6, as is the case with the rib 21. In this instance, it is preferred that all-around fillet welding be performed in such a manner as to include areas around the ribs 21, 24. The rib 24 has the same function as the rib 21.

Figure 3D:
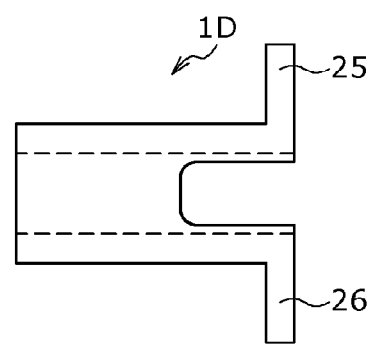

The hook bracket 1D, which is illustrated in FIG. 3D, differs from the hook bracket 1 in that the former includes an upward protruding rib 25 and a downward protruding rib 26 at the rear end of the shaft portion 2. When the hook bracket 1D is to be mounted on the bumper reinforce 5, the ribs 25, 26 are brought into contact with the rear wall 7 of the bumper reinforce 5 from the rear side and fillet-welded (particularly the protruding ends of the ribs 25, 26 are fillet-welded) to the rear wall 7. In this instance, the left and right sides of the ribs 25, 26 may be fillet-welded to the rear wall in order to obtain an increased weld length.

The hook brackets illustrated in FIG. 1, FIG. 2, and FIGS. 3A to 3D are to be disposed on a straight-line portion of the bumper reinforce (a portion of the bumper reinforce whose longitudinal direction is parallel to the direction of vehicle width). However, the hook brackets according to the embodiment of the present invention can be disposed on an inclined portion of the bumper reinforce (a portion of the bumper reinforce whose longitudinal direction is slanted toward the vehicle body and away from the direction of vehicle width) as described in Japanese Patents No. 4229388 (FIGS. 1 and 2) and No. 5374431. In this case also, the extrusion direction of the hook bracket is the longitudinal direction of the bumper reinforce as described in Japanese Patents No. 4229388 (FIGS. 1 and 2) and No. 5374431.

An aluminum alloy extrusion having an arbitrary composition may be used to form the bumper reinforce and the hook bracket that are associated with the mount structure according to the embodiment of the present invention. However, it is particularly preferred that a 6000 or 7000 series aluminum alloy extrusion be used.

The cut 3 may be not only shaped like the letter U but also formed in various shapes such as the shape of the letter V or a semicircle. However, the U-shaped cut is preferred in view, for example, of the extrusion rate of an aluminum alloy extrusion (any acute-angled portion of the extrusion cross-section will decrease the extrusion rate) and the effect of weight reduction (a semicircular cut will provide a lower degree of cross-sectional area reduction than a U-shaped cut).

FEM Analysis of Conventional Mount Structure

As regards the mount structure for a conventional hook bracket, FEM (Finite Element Method) analysis was performed to determine reaction force that was generated on the hook bracket when forward towing load was applied to the front end of the hook bracket.

Figure 4:
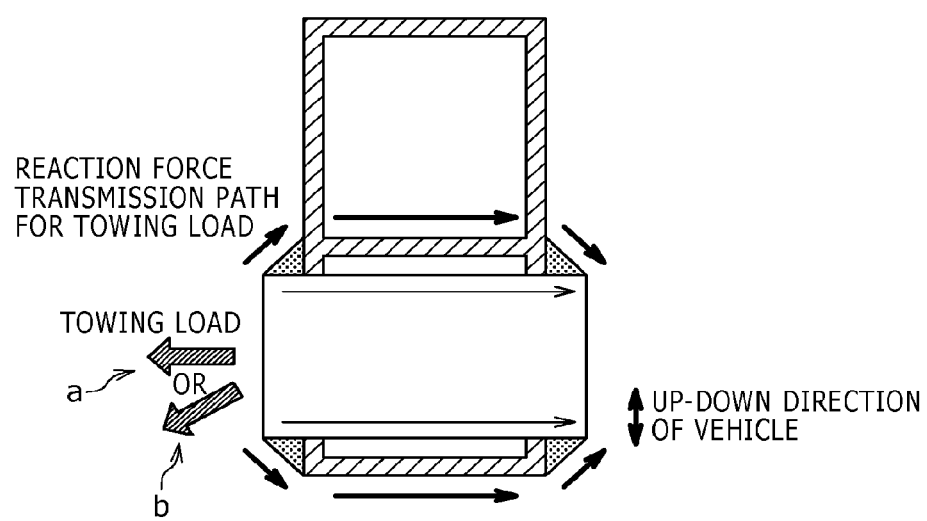
FIG. 4 is a diagram illustrating a mount structure for a conventional hook bracket and bumper reinforce that are to be FEM-analyzed.

The FEM analysis was performed under conditions where the cross-section of a bumper reinforce and hook bracket was shaped as illustrated in FIG. 4. The cross-section of the bumper reinforce had the same shape as the cross-section of the bumper reinforce 5 illustrated in FIG. 2. The outline of the hook bracket was shaped like a rectangular parallelepiped (the hook bracket differed from the hook bracket 1 illustrated in FIG. 2 only in the presence of the cut 3) and provided with an internally threaded hole. The internally threaded hole was formed to penetrate the center of the hook bracket in a front-rear direction. As regards the welding of the bumper reinforce and hook bracket, the whole circumference of both the front and rear walls of the bumper reinforce was welded.

Further, it was assumed that the bumper reinforce and the hook bracket were formed of a 7000 series aluminum alloy extrusion. A towing load of 30 kN, which was oriented in a forward direction (see arrow a), was applied to the front end of the hook bracket to determine the reaction force generated on the hook bracket. The general-purpose finite element analysis code ABAQUS was used for the FEM analysis.

Figure 5:
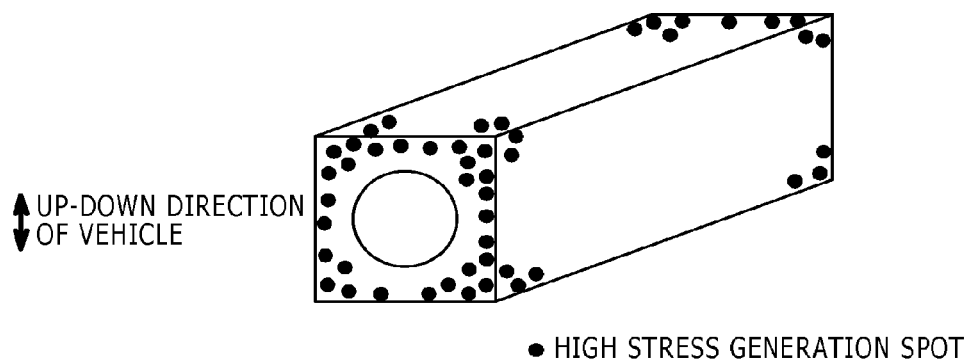
FIG. 5 is a perspective view illustrating the result of FEM analysis.

FIG. 5 illustrates the result of the FEM analysis. Referring to FIG. 5, the black circular (●) mark put on the surface of the hook bracket represents a spot where a stress higher than a predetermined value was applied to the hook bracket. As illustrated in FIG. 5, a high stress was generally generated on the front side to which a towing hook of the hook bracket was attached. The high stress was particularly generated on a ridge line portion. Meanwhile, the high stress was rarely generated on the rear side. In particular, the high stress was not generated on the left and right portions of the hook bracket (the portions on which the U-shaped cut 3 is formed for the hook bracket according to the embodiment of the present invention).

Even when a transmission path for a towing load of 5 kN, which was oriented in a forward-downward direction (see arrow b in FIG. 4), was applied to the front end of the hook bracket, the high stress was rarely generated on the rear side of the hook bracket. Further, the high stress was not generated on the left and right portions of the hook bracket.

The hook bracket according to the embodiment of the present invention has a cut in the extrusion cross-section. The cut is extended from the rear end of the shaft portion into the hollow in the bumper reinforce. Therefore, the hook bracket cannot be fillet-welded to the rear wall of the bumper reinforce at a portion at which the cut is formed. However, it is obvious from the result of the above analysis that the towing performance does not significantly deteriorate due to the inability to perform the fillet welding.

Meanwhile, as the hook bracket according to the embodiment of the present invention has the cut in the extrusion cross-section, it achieves considerably greater weight reduction than during the use of a conventional material without the cut although the degree of weight reduction varies with the shape and depth of the cut.

It should be understood by those skilled in the art that various modifications, combinations, sub-combinations, and alterations may occur depending on design requirements and other factors insofar as they are within the scope of the appended claims or the equivalents thereof.

This application claims priority to Japanese Patent Application No. 2015-063822, filed Mar. 26, 2015, the entirety of which is hereby incorporated by reference.

What is claimed is:

1. A hook bracket to be mounted to a bumper reinforce having front and rear walls and a hollow cross-section, the hook bracket comprising:
    an aluminum alloy extrusion including a shaft portion able to penetrate from the front wall of the bumper reinforce to the rear wall of the bumper reinforce so that a front portion of the extrusion can be welded to the front wall of the bumper reinforce and a rear portion of the extrusion can be welded to the rear wall of the bumper reinforce, and
    a hole provided in the shaft portion and extending in a longitudinal direction of the shaft portion from the front portion of the extrusion toward the rear portion of the extrusion,
    wherein the extrusion has a cut extending into a wall of the extrusion and extended from the rear portion of the extrusion toward the front portion of the extrusion, and wherein the cut does not extend to the front portion of the extrusion.

2. The hook bracket according to claim 1,
    further comprising a rib protruding from the shaft portion; wherein the rib engages a front surface of the front wall of the bumper reinforce.

3. The hook bracket according to claim 2,
    further comprising a concaved fillet provided on the extrusion between a front side of the rib and the shaft portion.

4. The hook bracket according to claim 1, wherein the cut extends, in a direction transverse to the longitudinal direction, through the wall of the extrusion from the hole to a peripheral surface of the extrusion.

5. The hook bracket according to claim 1, wherein the hole is threaded.

6. An assembly of a bumper reinforce and a hook bracket mounted to the bumper reinforce, comprising:

a bumper reinforce having front and rear walls and a hollow cross-section;

an aluminum alloy extrusion including a shaft portion penetrating from the front wall of the bumper reinforce to the rear wall of the bumper reinforce, wherein a front portion of the extrusion is welded to the front wall of the bumper reinforce and a rear portion of the extrusion is welded to the rear wall of the bumper reinforce, and a hole provided in the shaft portion and extending in a longitudinal direction of the shaft portion from the front portion of the extrusion toward the rear portion of the extrusion, wherein the extrusion has a cut extending into a wall of the extrusion and extended from the rear portion of the extrusion toward the front portion of the extrusion, and wherein the cut does not extend to the front portion of the extrusion.

7. The assembly according to claim 6, further comprising a rib protruding from the shaft portion; wherein the rib engages a front surface of the front wall of the bumper reinforce.

8. The assembly according to claim 7, further comprising a concaved fillet provided on the extrusion between a front side of the rib and the shaft portion.

9. The hook bracket according to claim 6, wherein the cut extends, in a direction transverse to the longitudinal direction, through the wall of the extrusion from the hole to a peripheral surface of the extrusion.

10. The hook bracket according to claim 6, wherein the hole is threaded.

* * * * *